Jan. 9, 1951          H. S. CAMPBELL          2,537,623
AIRCRAFT ROTOR HUB CONSTRUCTION
Filed Oct. 26, 1946          4 Sheets-Sheet 1
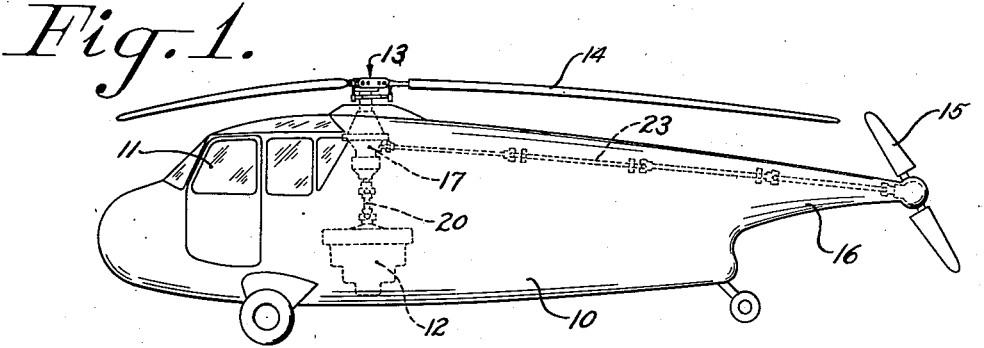
*Fig. 1.*
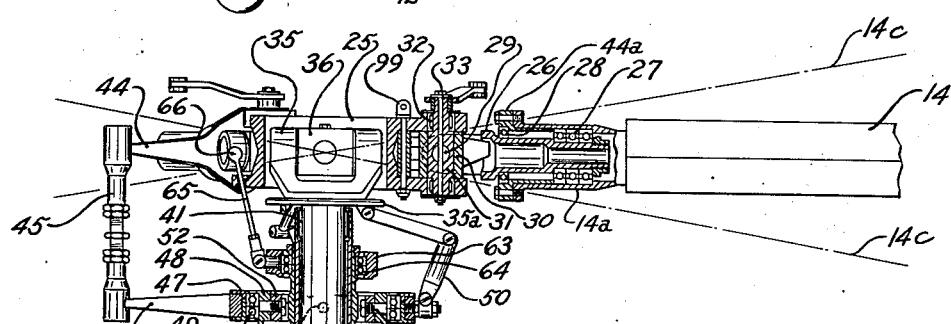
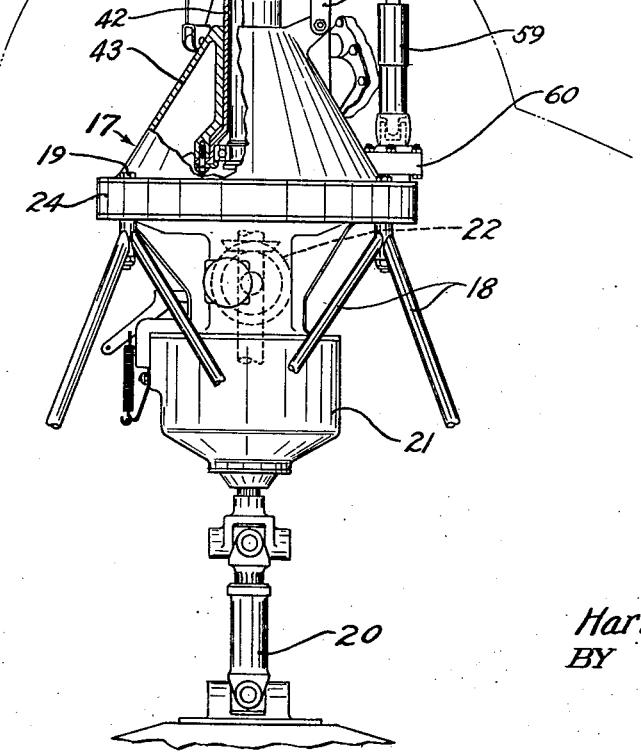
*Fig. 2.*
INVENTOR
Harris S. Campbell
BY
ATTORNEYS

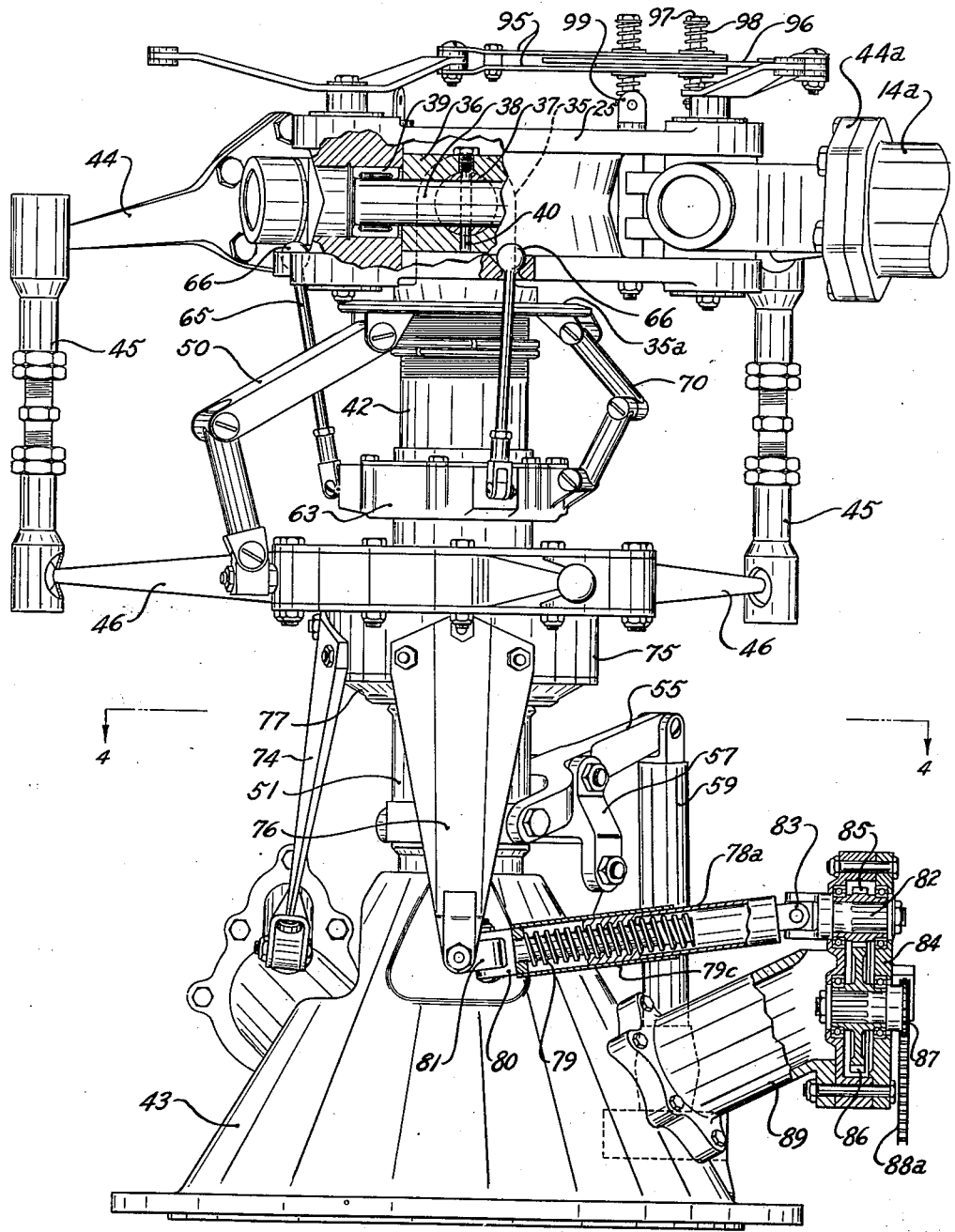

INVENTOR
Harris S. Campbell
BY
Ely + Frye
ATTORNEYS

Jan. 9, 1951            H. S. CAMPBELL            2,537,623
AIRCRAFT ROTOR HUB CONSTRUCTION
Filed Oct. 26, 1946            4 Sheets-Sheet 4

INVENTOR
Harris S. Campbell
BY
ATTORNEYS

Patented Jan. 9, 1951

2,537,623

UNITED STATES PATENT OFFICE 2,537,623

AIRCRAFT ROTOR HUB CONSTRUCTION

Harris S. Campbell, Bryn Athyn, Pa., assignor to The Firestone Tire & Rubber Company, Akron, Ohio, a corporation of Ohio Application October 26, 1946, Serial No. 706,014

10 Claims. (Cl. 170—160.26)

This invention relates to rotary wing aircraft and is more particularly concerned with improvements in the construction of transmissions and rotor hubs therefor including control operating mechanism for the latter.

In rotary wing aircraft of the helicopter type the rotor system is usually driven from a power plant located in the fuselage and connected to the rotor by means of a suitable transmission including reduction gearing. In helicopters having a single sustaining rotor a common method of counteracting the torque developed by the main rotor is by the use of a small torque rotor mounted in a vertical plane at the rear end of the craft and adapted to produce a horizontal thrust in a transverse direction.

In a craft of this nature which is adapted to hover and fly at very slow speeds the control of the craft is usually provided for by controlling the rotor (or rotors in the case of a multiple rotor craft) in a fashion to vary the lift reaction in direction and also in magnitude. Such control is usually accomplished by means of a mechanism for changing the pitch of the blades. The blade pitch control is normally arranged for change of pitch in two different fashions, namely, simultaneous pitch change to provide for increase or decrease of rotor lift and differential or cyclic change of pitch in which the lift vector is inclined for purposes of positional control.

One of the primary objects of the present invention is to provide a rotor construction having improved mechanism for the control of blade pitch to give more accurate and smoother control response and, indirectly, to provide improved vibration characteristics for the aircraft due to the more accurate blade control. This improvement in operational characteristics and in control operation may be attributed in large part to the geometry of the control system and the mechanism used in the system which prevents the development of motions in the control system in response to forces or moments of a dynamic or aerodynamic nature developed in the rotor blades.

In rotor craft of the type with which this invention is concerned the rotor blades are often connected to the rotor hub by means of pivots or hinges which allow freedom of motion of the blades with respect to the hub in a flapping sense and in a drag sense, in addition to the pitch change freedom mentioned previously. One of the objects of the invention is to provide an improved construction for such blade attachment parts, including the movement limiting stops and the assembly arrangement which permits the blades to be either readily removed from the hub or alternatively to be readily folded for storage purposes.

In the particular example of hub construction disclosed in the present application the hub member to which the blades are attached is mounted on the rotating axle to allow universal tilting movements with respect thereto while providing for the transmission of torque between the axle and the rotor. Such a tilting or floating member in the hub structure has certain advantages in centralizing the forces of rotor operation to improve the quality of operation and reduce the transmission of vibrations to the craft. In a floating hub construction of this nature it is desirable to have the floating position of the hub locked out or held in neutral position at such times as the rotor is not rotating at speeds approaching normal operation. The reason for this is that the centrifugal and other forces incidental to the operation of the rotor are relied upon to maintain the floating member in proper relative position with respect to the axle. In the absence of these operational forces the floating member may allow the rotor blades to tilt around to various indeterminate positions within the range of the tilting movement instead of being held in a definitely fixed position. In order to provide for this locking out of the floating member the present invention has as an object, the provision of mechanism and linkages in the control system which operate in conjunction with the simultaneous pitch control to cause the locking out operation without the need for a separate manual control element. Further, this locking out operation is correlated with the simultaneous pitch operation in such a fashion that the locking out occurs for all practical purposes in an automatic fashion. This is accomplished by arranging that the part of the motion of the simultaneous control lever from autorotational pitch to zero lift position also actuates the lock-out mechanism.

A further object of the invention is to provide a control linkage arrangement which is simple in nature and provides for both simultaneous and differential pitch operation with a minimum interference of the control pitch setting upon movement of the simultaneous control and vice versa. According to the present invention this improved functioning is accomplished with a reduced number of parts.

It is also an object of the invention to provide an improved mechanism for actuation of the simultaneous or collective pitch control. This mechanism involves a comparatively simple linkage which includes the function of acting as a positioning means for prevention of rotation of the swash plate supporting structure, thus eliminating the need for splines, key-ways or the like in connection with the support of the vertically movable swash plate.

How the foregoing and other objects and advantages incidental to this invention are accomplished will be clearly evident to those skilled in the art from the following description of the drawings in which—

Figure 1 is a side elevational view of an aircraft of the type to which the present invention is applicable.

Figure 2 is a view from the front showing the mounting of the hub and mechanical transmission mounted in the aircraft.

Figure 3 is a view to an enlarged scale showing details of the hub structure and the controls immediately associated therewith.

Figure 6:
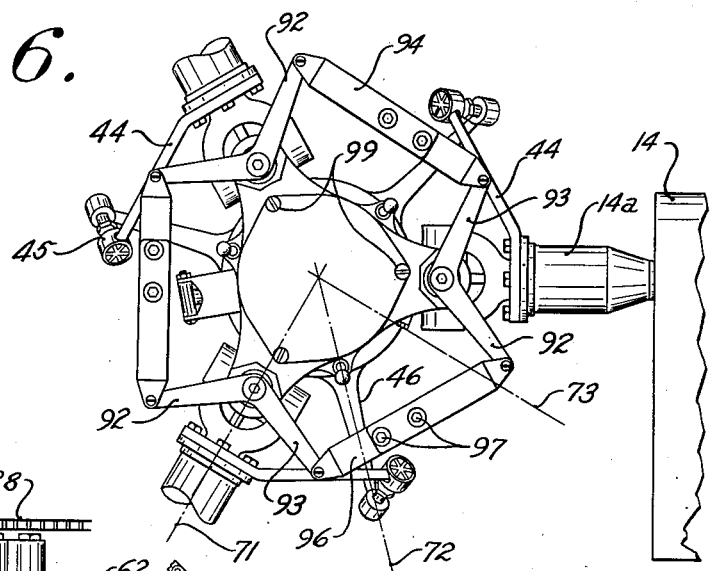
Figure 6 is a plan view of the rotor hub of the present invention with the rotor blades in operative position.

In Figure 1 the general arrangement of an aircraft to which the present invention is applicable is shown. Here it will be seen that fuselage 10 incorporates a forward occupant's compartment 11 and houses a power plant indicated at 12. The sustaining rotor of the craft is indicated generally by numeral 13 and includes a plurality of blades 14 attached to the rotor hub 13. A rear rotor having blades 15 is supported on an extension 16 of the fuselage. This rear rotor is adapted to produce a transverse horizontal thrust capable of counteracting the torque of the main sustaining rotor during the periods when it is power driven and also to provide for directional control of the craft. It should be noted that the blades of the main rotor are preferably capable of adjustment to allow autorotational operation to provide suitable sustentation in the absence of power drive.

The transmission and hub unit 17, which is more clearly illustrated in Figure 2, is supported in the fuselage 10 by means of mounting structure having members 18. Attachment of the unit 17 to the fuselage may be accomplished by the use of bolts 19. In the present example there are provided four bolts 19, the removal of which allows removal of the rotor hub and transmission system from the fuselage.

It will be noted that the drive from the engine 12 is transmitted by means of drive shaft 20 having suitable sliding spline connections and universal joints. The transmission system includes preferably an engageable clutch and an overrunning clutch which may be housed in compartment 21. Take off gears for the rear torque rotor drive are indicated at 22. Gears 22 drive a shaft 23 (see Figure 1) to provide the power for operation of the rear rotor. The main reduction gears for the rotor drive are included in the portion of the housing indicated at 24. The portion of the mechanism from this point upwardly is associated with the main rotor drive and support, and the controls for the main rotor.

The blades 14 are connected to the rotor hub member 25 by means of pivots which allow movement of the blade in the pitch, flapping and drag senses. A fork member 26 includes a shank which projects into the root end cylinder of the blade and supports a series of thrust bearings 27 adapted to carry the centrifugal force developed by the blade during rotation. An inboard bearing 28 transmits radial loads to provide for the transmission of bending moments between the blade and the fork structure.

The fork 26 is attached by means of a horizontal flapping pivot 29 which extends through a block 30 and the drag pivot structure 31. Bearings are provided in the ears of forks 26 similar to the bearings 32 illustrated in the lugs of the hub member 25.

It will be noted that the vertical pivot structure 31 is a cylinder with a larger diameter in the middle region than the diameter of horizontal pivot member 29. The end portions of pivot member 31 are reduced in diameter to a diameter approximately equal to that of the horizontal pivot 29 so as to fit inside bearings 32. The outside diameter of bearings 32 is slightly larger than the maximum diameter of pivot 31. This construction allows assembly of the pivot parts in the following manner. The block 30 is placed in a position between the lugs of hub 25 and the vertical pivot part 31 is inserted by passing it through the bore in hub 25. The bearings 32 are then placed in position and with the fork 26 in place the horizontal pivot 29 is inserted through the holes provided in block 30 and vertical pivot part 31. The bolt 33 is then inserted and holds in position suitable retaining plates to retain bearings 32 in place.

In the form of hub illustrated the main hub member 25 is supported upon the rotor axle 34 in a fashion to allow floating or universal movement in a tilting sense. This is accomplished by the use of a universal joint structure which includes the fork 35 at the upper end of the axle 34, the block member 36 and suitable pivots located at right angles to each other. This particular construction is more clearly illustrated in Figure 3 where it will be seen that a large diameter pivot pin 37 is supported in block 36 and extends into bearings in the fork legs 35. Transverse pin 38 extends through block 36, pivot pin 37 and into suitable openings in the hub structure 25 where it is mounted on bearings 39. A retention bolt 40 is used to prevent movement of trunnion pins 37 and 38 in the block 36. With this construction lift loads developed by the rotor and the torque for driving the rotor are transferred between the hub and axle while at the same time the hub member 25 is free to tilt in any direction with respect to said axle within a limited range. This range is indicated by center-lines 14c and is limited by stop plate 35a attached to fork 35. It will be seen that the hub 25 may be removed by removal of the bolt 40, removal of the dust plates in the hub 25 at the end of pin 38 and withdrawing pivot 38.

The axle 34 is supported at the upper end by bearing 41 which is mounted in the cylindrical sleeve 42. The cylindrical sleeve 42 is rigidly attached to the conical base casting 43. The lower end of axle 34 is supported in a ball bearing mounted in base casting 43 which bearing is adapted to take the thrust loads from the rotor as well as radial loads.

Control of the rotor is effected by means of varying the pitch of the blades either simultaneously when it is desired to increase or decrease the lift of the rotor or differentially for positional control purposes. To change the pitch of the blades an arm 44 is attached to the root end cylinder of each blade 14. This arm projects forwardly with respect to the blade, that is, at the leading edge side of the blade. This arm 44 is attached to a flange 44a on the sleeve which transmits the thrust to the bearings 27. It will be noted that the root and blade cylinder 14a has a flange which is bolted to sleeve flange 44a. The end of arm 44 is formed into a ball the center of which is approximately in line with the axis of the horizontal blade pivot 29 when the blade is in radial position and approximately middle pitch position. A push-pull rod 45 which may be adjusted in length to provide ease of setting the blades connects arm 44 to a lower horizontally disposed arm 46 attached to the swash plate unit. Push rod members 45 are equipped with suitable ball sockets at each end to attach to the balls at the end of arms 44 and 46, thus allowing universal movement with only tension and compression loads transmitted through rods 45.

The swash plate structure includes an outer ring assembly indicated at 47 in Figure 2 and an inner ring assembly 48. Ball bearings 49 are interposed between rings 47 and 48 to permit the outer ring 47 to rotate with the hub while the inner ring 48 remains stationary. Scissors mechanism 50 is used to connect the outer ring 47 with the rotating axle to assure proper positioning of the arms 46 at all times during operation. It will be noted that scissors 50 is equipped at the lower end with suitable joint construction to allow tilting movements of the swash plate as well as vertical movements.

The inner stationary ring 48 of the swash plate is supported on a vertical slidable cylindrical sleeve 51. A gimbal ring 52 is connected to sleeve 51 by means of trunnions 53. Ring 52 is also connected by trunnions 54 to the swash plate ring 48. In this fashion the swash plate may be universally tilted with respect to cylinder 51.

The lower end of cylinder 51 is supported by means of a beam 55 having a forked portion adapted to partially encircle cylinder 51. The ends of the fork are connected to cylinder 51 by bolts 56 forming a pivot, a link member 57 being pivotally attached to lever 55 and also to a fitting or bracket attached to the base 43. The outer end of beam 55 is connected by pivot 58 to the end of a screw jack unit 59. The lower end of the screw jack unit 59 is attached to hub base 43 by a housing 60 in which is mounted suitable sprocket and bearing parts to permit operation of the screw jack 59 by means of a chain 61 which is clearly illustrated in Figure 4.

It will be evident therefore that by operation of the chain 61 through the medium of cable connection 62 to suitable pilot controls that the screw jack member 59 may be lengthened or shortened to raise or lower the position of cylindrical member 51. The beam 55 and link 57 serve not only to support the swash plate and transmit the vertical movements thereto but also to prevent rotation of the cylinder 51 with respect to the stationary hub axle 42. This construction thus eliminates the need for splines or keys and therefore simplifies the construction of the control mounting while at the same time providing for improved mechanical operation since it eliminates the binding and friction inherent in sliding parts which use key ways or the like for resisting rotation.

It will be observed in Figure 2 that the beam 55 is horizontal thus holding the sleeve 51 in approximately mid position. Operation of the screw jack 59 through the medium of the control system can raise or lower the sleeve 51 and thus the swash member arms 46 thereby either raising or lowering the pitch of all the blades simultaneously.

Supported at the upper end of sleeve 51 is a ring 63 having bearings 64 interposed to allow relative rotation of ring 63 with respect to sleeve 51. Attached to the ring 63 by means of a pair of pivots which allow free tilting movement are three rods 65 the upper ends of which extend through openings in the lower part of hub member 25. A spherical shaped terminal 66 is provided at the upper end of each rod 65. As will be more clearly noted in Figure 3 the spherical portion 66 is adapted to seat in the depressions formed in the lower flange of hub member 25. It will be noted that in Figure 3 the position of the beam 55 is in the bottom extreme position. It is in this lowered position of sleeve 51 that the rod 65 comes into a position so that all three balls 66 contact the hub 25 and thereby cause it to be moved to a centralized position and to be retained there by the action of the tension in the three rods 65. This position of the sleeve 51 and rods 65 corresponds to the zero pitch position of the blades and this zero setting is used only when the aircraft is upon the ground.

Figure 5:
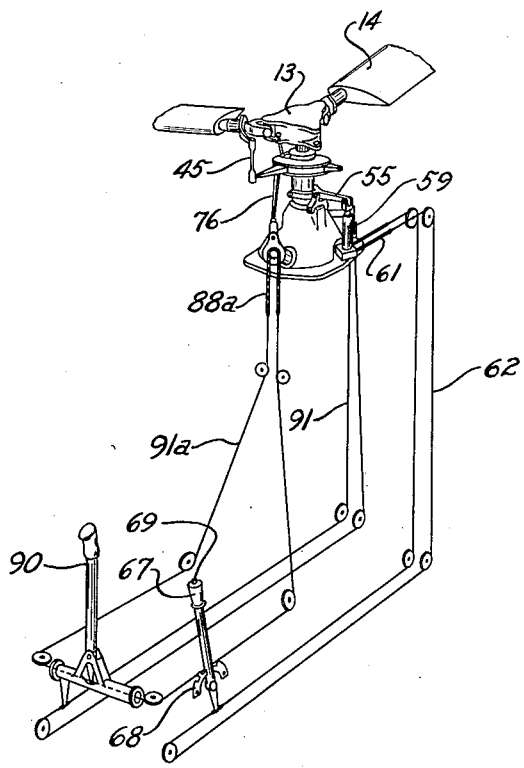
Figure 5 is a perspective view illustrating the control system connections between the rotor and the pilot's controls.

Reference to Figure 5 will show that cables 62 which operate the simultaneous pitch control extend to the simultaneous pitch lever 67. The movement of lever 67 controls the average pitch setting of the blades. When the blades are at rest upon the ground the lever 67 is normally moved to its forward position corresponding to zero pitch in the blades. In this position the lever 67 may be latched in a suitable sector 68, there being a button 69 provided for the engagement and disengagement of the latch for this position. Thus the hub, while the rotor is at rest, is held in a fixed centralized position so that the aircraft may be moved or exposed to a wind without danger of the rotor tilting and allowing the blades to contact the fuselage or other obstruction. In operation the simultaneous pitch is normally released from zero position only after the rotor blades have been given an appreciable initial rotational speed by engagement of the rotor transmission with the engine. Once the blades have reached approximately ⅓ their normal rotational speed there is sufficient centrifugal force to maintain them in proper relative position with respect to the hub. At this speed it is practical to increase the blade pitch and thereby release the floating member 25 to allow it full tilting freedom as indicated by the position of the parts in Figure 2.

This method of connecting the floating hub member lockout with the simultaneous pitch control reduces the number of controls required and at the same time provides for automatic release of the floating member prior to flight since take off can not be accomplished without sufficient increase of blade pitch to cause full release of the floating member. Ordinarily it is desirable that full release be provided when the blades have been raised to a pitch corresponding to autorotational position. It will be noted that a scissors illustrated at 70 in Figure 3 is provided to connect the ring 63 with the fork plate 35a to maintain proper rotational positioning of the lockout links with respect to the hub while permitting freedom for vertical movement of the ring 63.

The lateral and longitudinal control of the craft is attained chiefly through the medium of differential or cyclic variation of pitch of the rotor blades. As was previously described the swash plate is mounted by means of the gimbal ring construction for tilting movement in any plane. The tilting action is accomplished by proper movement of the pilot's flight control stick through the medium of mechanism shown most clearly in Figures 3 and 4.

In a control system for a rotor having pivotally mounted blades such as has been described above, the change of blade pitch to produce a control moment on the craft must occur at a point in advance of the azimuth at which the control motion is to occur. In the present configuration the advance angle is approximately 90°. In the hub configuration shown the proportions of the blade control arms is such that the angle between the blade axis and the corresponding radial position of the swash plate arm 46 is approximately 45°. This will be seen by reference to Figure 6, line 71 representing the blade axis and line 72 representing the position of arm 46. In this case then, if blade axis 71 represents the lateral advancing position of the blade, line 73 at 90° to axis 71 would represent the fore and aft axis of the aircraft. Thus for a longitudinal control motion the arm 46 would be raised to cause a maximum increase in pitch of the blade at position 71 and a minimum pitch position at a point 180° from position 71.

Figure 4:
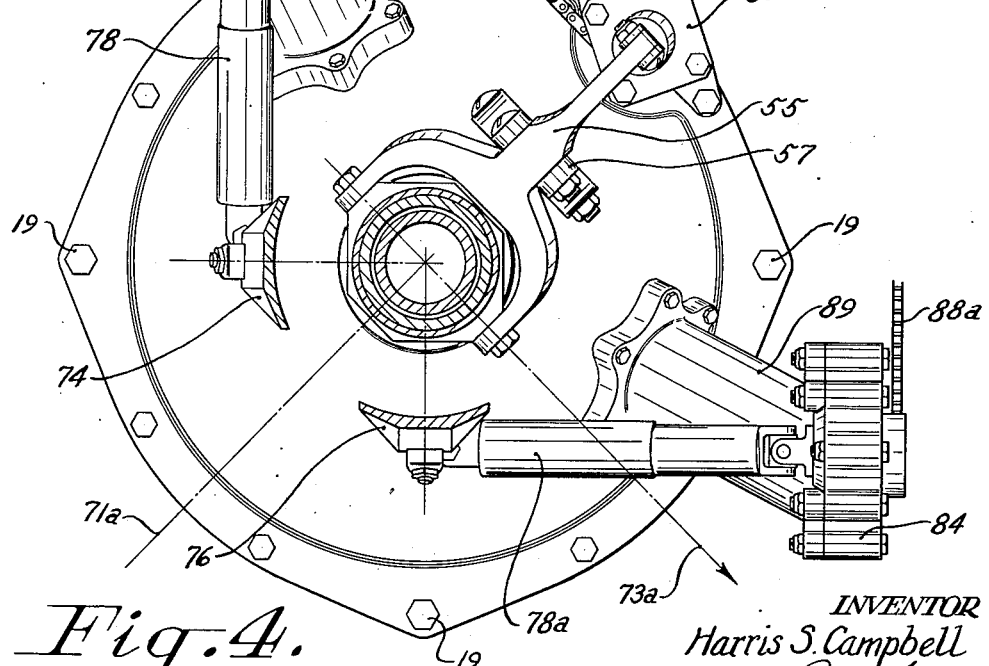
Figure 4 is a view of the structure shown in Figure 3 taken along in the direction of arrows 4—4, Figure 3.

Now referring to Figure 4, if line 73a represents the fore and aft axis of the craft, line 71a will represent the transverse axis. In order to tilt the swash plate in the proper direction for a longitudinal control movement, the longitudinal control arm 74 is moved. As will be seen in Figures 2 and 3, arm 74 is bolted to the depending skirt 75 which is connected with the inner non-rotating swash plate ring 48. Similarly lateral control arm 76 is attached to skirt 75 at a position 90° removed from longitudinal arm 74. Thus through the medium of arms 74 and 76 the swash plate may be tilted in any azimuth desired. It will be noted that a stop ring 77 is provided to limit the angle of movement of the swash plate tilting action to the maximum range needed for control purposes.

Motion of the lateral and longitudinal levers 74 and 76 is provided for by the screw jack members 78 and 78a. Since the details of both lateral and longitudinal jacks are the same, the construction will be described with reference to the lateral control jack which is shown in section in Figure 3. The worm thread portion 79 of the screw jack terminates in fork 80 which is connected to the lower end of the tilting lever 76 by means of an universal block structure 81. This allows swinging motion of the end of arm 76 in any direction with respect to the screw jack. A cover tube 79c is used to prevent entry of dirt to the screw parts. The opposite end of the jack is connected to a shaft 82 by means of an universal joint construction 83. Shaft 82 is mounted in a housing 84 by means of suitable bearings and has a gear 85 attached thereto to cause rotational movements to be transmitted to the shaft 82. Gear 85 meshes with gear 86 which is also mounted by bearings in the casing 84. An external sprocket 87 serves to transmit motions initiated by chain 88a to the gear 86.

The housing 84 is supported on a tubular bracket member 89 which in turn is fastened to the main base member 43 of the hub. With this construction and mounting for the lateral and longitudinal screw jacks it will be evident that loads transmitted from the swash plate are carried directly from arms 74 and 76 into the screw jack members to the mounting brackets and into the hub base. Thus the loads from the control are carried into the structure through a minimum of members, links or joints. The effect of lost motion or play in the control system is thereby greatly reduced. Since most of the mechanical reduction for the control system is accomplished in the screw jack unit the loads in the control cables and control members running to the control stick may be kept a minimum. In addition, locating the screw jack member close to the swash plate member provides for the prevention of the transmission of fluctuating or vibrational loads and motions from the rotor to the rest of the control system. This is due to the fact that the angle selected for the pitch of the screw jack thread, while being reversible when a steady load is applied, has an inefficiency with respect to motions initiated in the rotor sufficient to restrain the transmission of rapidly applied reversing loads. It will be understood that the worm thread of unit 59 for the collective pitch control is similar in construction to the units 78 and 78a.

From Figure 5 it will be seen that the pilot's control stick 90, by means of which the lateral and longitudinal control of the aircraft is accomplished, is interconnected with the lateral and longitudinal control mechanism mounted at the hub. Lateral control motions of the stick cause movement of cables 91a which are connected with chain 88a to operate the lateral control. Likewise fore and aft motions of the control stick 90 cause operation of cables 91 which is connected with chain 88 to operate the longitudinal screw jack mechanism. The directional control of the aircraft is accomplished through the medium of rudder pedals with operational connections to control the pitch of the tail rotor unit. This control is not illustrated since it is not concerned directly with the present invention.

In Figure 6 a plan view of the blades in radial operating position is shown. This figure also shows the arrangement of the blade damping mechanism used for controlling the differential motion of the blades on their vertical or drag pivots. For each blade a pair of arms 92 and 93 is supplied. These arms are connected to a hub which is rigidly attached to the drag pivot member 31 (see Figure 2) so as to transmit rotational movements of the pivot 31 to the arms 92 and 93. Any suitable means of fastening between the arms and the pivot member may be used such as, for example, splines or serrations. Arms 92 and 93 are arranged so that they lie approximately parallel to the arms 92 and 93 of the adjacent blades. Between the end of arm 92 of one blade and arm 93 of an adjacent blade there is supported by pivots a damper device illustrated at 94. In the present disclosure a friction type damper is illustrated having external plates 95 (see also Figure 3) and an internal plate 96 with suitable friction material interposed between the external and internal plates. Bolts 97 having springs 98 associated therewith are used to apply pressure between the external and internal plates. This pressure may be adjusted to the desired amount to give proper frictional resistance in the damping device. A slot is provided in the inner plate 96 to allow it to move past the bolts 97 to supply the relative sliding motion upon lengthening or shortening of the distance between the ends of the dampers such as occurs when the angular spacing between blades changes.

This arrangement of damping mechanism and its connection to the blade provides a simple construction which is easy to service or to change or disconnect damper units. Only the drag movements of the blades are transmitted to the damping mechanism thus eliminating any undesirable restriction to flapping motions of the blade.

Figure 7:
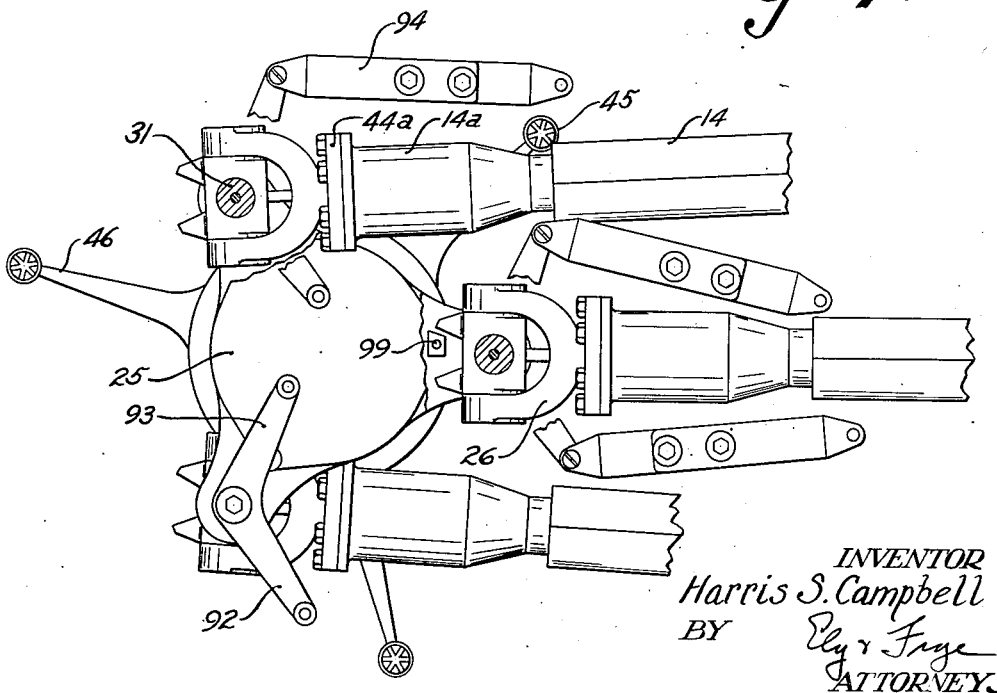
Figure 7 is a plan view similar to Figure 6 but showing the blades arranged in folded position with respect to the hub for storage purposes.

Such a damping arrangement is also of advantage when it is desired to fold the blades for storage purposes. The blades are shown in folded position in Figure 7 where it will be observed that two of the blades have been rotated upon their drag axes until they lie generally parallel to the third blade. This folding operation is accomplished by removal of the drag stop bolts 99 from the two blades to be folded. Also one end of each of the friction dampers is released by removal of one of the pivot pins. The upper ends of push rods 45 are disconnected from the end of blade pitch arms 44. The blades may then be moved into folded position, the arms 44 being rotated to allow the blades to lie in a more or less vertical plane to allow more compact folding.

In case it is desired to remove the blades from the rotor hub this may be readily done by removal of vertical bolt 33 (see Figure 2) which allows withdrawal of horizontal pivot 29. Disconnection of push rod 45 from arm 44 then permits removing the blade.

From the foregoing it will be evident that I have provided an improved transmission and rotor system for rotary wing aircraft. Arrangement of assemblies into a compact unit which is readily removable from the aircraft is of obvious advantage. The construction also provides for easy removal of the blades individually or the blades and center hub member as a unit while leaving the axle portion in the craft. The detail improvements in the rotor and control system construction, particularly with respect to the lockout mechanism for the floating hub member, the structure and mechanism of the longitudinal and lateral control system, and the blade mounting and associated parts, all combine to provide improved operational characteristics and increased reliability. The mounting of the screw jack control units directly on the hub base support with the screw jack axis horizontal eliminates any practical effect on the positional control setting when the collective control lever is moved. This mounting further reduces the number of linkages and joints in the control system resulting in simplification while providing improved control action.

I claim:

1. For a rotary wing aircraft, a rotor having a vertical rotatable axle member and a fixed support, blade pitch control mechanism including a tiltable swash plate unit having a part rotatable with said axle member and a non-rotatable part, a depending member from said non-rotatable part for causing tilting movement of said swash plate, a bracket part attached to said fixed support, a control unit, one end of which is universally connected to said depending member and the other end of which is universally connected to said bracket part, said control unit being constructed for extension and retraction motion between the connections.

2. For a rotary wing aircraft, a rotor having a vertical rotating axle member and a fixed support, blade pitch control mechanism including a swash plate unit having a part rotatable with said axle member and a non-rotatable part, two vertically disposed arms attached to said non-rotatable part and angularly spaced from each other approximately 90°, a substantially horizontally disposed member attached to the lower end of each of said arms, said members being capable of being lengthened and shortened for control actuating purposes, and means for supporting said horizontal members on said fixed support.

3. A rotor hub unit for an aircraft including a hub member to which the rotor blades may be attached, a rotatable axle member, a universal joint connection between said axle member and said hub member, a slidable member supported on said hub and adapted to be moved vertically to transmit movements for actuation of the simultaneous blade pitch control, a plurality of rods attached to said slidable member each having a ball seat at the upper end adapted to contact said hub member when the slidable member is in its lowered position thereby restraining tilting movements between the hub member and the axle member.

4. An aircraft sustaining rotor having a hub unit incorporating a floating hub member, a plurality of blades pivotally connected to said floating hub member, a rotatable axle member attached to said hub member by means of a universal joint to provide the floating action, control mechanism for the rotor blades including a vertically slidable sleeve for transmission of collective blade pitch control movements, a mechanism associated with said sleeve for locking out the floating movement of said hub member with respect to said axle member when said sleeve is in its lowered position, said mechanism including a member rotatably attached to the upper end of said sleeve, a plurality of rods each being universally connected to said rotatably attached member at the lower end and adapted to contact said hub member at the upper end, and scissors linkage connected to said rotatably attached member to cause rotation thereof with said rotatable axle.

5. A rotor hub unit for an aircraft including a vertically disposed elongated axle member, blade pitch control mechanism including a sleeve surrounding said axle and adapted to be moved axially with respect thereto, a swash plate member having a part attached to said sleeve for tiltable movements with respect thereto, and a rotatable part attached to said first part, a short cylindrical skirt attached to said first part, two depending arms removably attached to said skirt, said arms being spaced at 90° to each other angularly considered in a plane transverse to the axis of said axle.

6. A rotor hub unit for an aircraft including a vertically disposed elongated axle member, blade pitch control mechanism including a sleeve surrounding said axle and adapted to be moved axially with respect thereto, a swash plate member having a part attached to said sleeve for tiltable movements with respect thereto, and a rotatable part attached to said first part, a depending arm attached to said first part, means for applying control forces to the lower end of said arm in a direction approximately perpendicular to a radial plane through said arm, and a scissors linkage connected to said sleeve for preventing rotation of said sleeve due to the torque induced by the application of control forces to said arm.

7. A rotor hub unit for an aircraft including a vertically disposed elongated axle member, blade pitch control mechanism including a sleeve surrounding said axle and adapted to be moved axially with respect thereto, a swash plate member having a part attached to said sleeve for tiltable movements with respect thereto, and a rotatable part attached to said first part, a short cylindrical skirt attached to said first part, tilting control means attached to said skirt and limiting stop means attached to the lower end of said skirt and located to contact said sleeve for limiting the angle of tilt of said swash plate member.

8. A helicopter rotor hub unit having a rotatable axle, a fixed structure supporting said axle, a sleeve adapted to move vertically, a blade pitch control swash unit tiltably supported on said sleeve, a depending arm attached to said swash unit, a horizontal control member located to apply a force to said arm in a direction approximately ninety degrees from a radial plane through said arm, a generally horizontal lever for actuating said sleeve having a pivotal connection to said sleeve, a vertical link having one end pivoted to said lever and the other to the fixed supporting structure.

9. A rotor hub unit for an aircraft including a hub member to which the rotor blades may be attached, a rotatable axle member, a universal joint connection between said axle member and said hub member, a slidable member supported on said hub and adapted to be moved vertically to transmit movements for actuation of the simultaneous blade pitch control, a plurality of rods attached to said slidable member each having a ball seat at the upper end adapted to contact said hub member when the slidable member is in its lowered position thereby restraining tilting movements between the hub member and the axle member, a swash plate member attached to said vertically slidable member, said swash member being tiltable with respect to said slidable member, a short cylindrical skirt attached to said swash member, tilting control means attached to said skirt and limiting stop means attached to said skirt and adapted to contact said slidable member.

10. For an aircraft having a sustaining rotor, a rotor hub assembly including means for pitch change attachment of a rotor blade, a generally vertical rotatable axle, fixed structure supporting said axle and forming part of said hub assembly, a swash plate unit having a part rotatable with said axle and a non-rotatable part, a control connection between said rotatable part and said pitch change attachment means, a generally vertical member depending from said non-rotatable part, a bracket attached to said fixed hub structure, a horizontally disposed worm mechanism universally attached at one end to said vertical member and at the other end to said bracket.

HARRIS S. CAMPBELL.

REFERENCES CITED

The following references are of record in the file of this patent:

UNITED STATES PATENTS

| Number | Name | Date |
|---|---|---|
| 1,263,748 | Davis et al. | Apr. 23, 1918 |
| 1,267,852 | Curtis | May 28, 1918 |
| 2,030,578 | Flettner | Feb. 11, 1936 |
| 2,256,635 | Young | Sept. 23, 1941 |
| 2,265,193 | Platt et al. | Dec. 9, 1941 |
| 2,376,523 | Synnestvedt | May 22, 1945 |
| 2,396,038 | Bossi | Mar. 5, 1946 |
| 2,402,349 | Sikorsky | June 18, 1946 |
| 2,428,200 | Campbell | Sept. 30, 1947 |
| 2,429,646 | Pullin | Oct. 28, 1947 |
| 2,430,947 | Platt et al. | Nov. 18, 1947 |
| 2,432,677 | Platt et al. | Dec. 16, 1947 |
| 2,437,330 | Mullgardt | Mar. 9, 1948 |
| 2,440,225 | Pullin | Apr. 20, 1948 |
| 2,444,070 | Stanley | June 29, 1948 |
| 2,465,674 | Crowell | Mar. 29, 1949 |
| 2,473,299 | Pitcairn | June 14, 1949 |
| 2,475,333 | Morris | July 5, 1949 |
| 2,481,747 | Hiller | Sept. 13, 1949 |
| 2,481,748 | Hiller | Sept. 13, 1949 |

FOREIGN PATENTS

| Number | Country | Date |
|---|---|---|
| 653,402 | Germany | Nov. 23, 1937 |